Patented Apr. 21, 1931

1,801,745

UNITED STATES PATENT OFFICE

HANS KÄMMERER, OF MANNHEIM, GERMANY, ASSIGNOR TO GENERAL ANILINE WORKS, INC., OF NEW YORK, N. Y., A CORPORATION OF DELAWARE

AZO DYESTUFFS CONTAINING CHROMIUM AND PROCESS OF MAKING

No Drawing. Application filed October 13, 1927, Serial No. 226,042, and in Germany October 22, 1926.

I have found that azo dyestuffs with excellent properties are obtained by combining the diazo compounds of o-aminonaphthol, or its diazotisable derivatives, with 1-naphthol-8-sulphonic acid. By treating the resulting azo dyestuffs, either in substance or on the fibre with chromium compounds, they can be converted into valuable chromiferous dyestuffs, which are distinguished by clarity of shade and excellent fastness to washing and milling.

The following examples further illustrate the nature of this invention which however is not restricted to these examples.

Example 1

1-amino-2-naphthol-4-sulphonic acid is diazotized, coupled with 1-naphthol-8-sulphonic acid in a strong solution of caustic alkali, and further treated in any suitable or known manner. The resulting dyestuff which probably has the following formula:

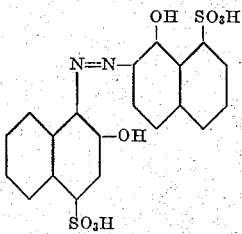

gives red dyeings on wool, the color becoming grey on chroming.

50 parts of this dyestuff are boiled for 10 to 15 hours under a reflux condenser with 150 parts of a chromium formate solution containing 9.5 parts of $Cr_2O_3$, the solution being then evaporated. The resulting chromiferous dyestuff, containing about 1 atom of chromium for each molecule of the above described azo compound, gives clear blue dyeings, with a greenish tinge, on wool, the properties in respect of fastness being very good.

Example 2

60 parts of the dyestuff prepared in a strong solution of caustic alkali from 1-naphthol-8-sulphonic acid and the nitrated diazo compound of 1-amino-2-naphthol-4-sulphonic acid which dyestuff probably has the formula:

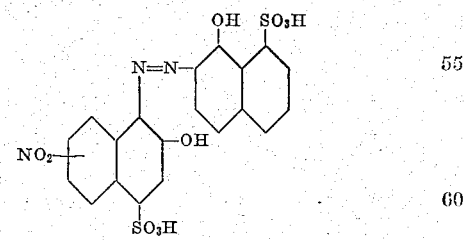

are heated to 120° centigrade in an autoclave for 3 hours with 200 parts of a solution of chromium formate containing 10.5 parts of $Cr_2O_3$, the solution being then evaporated. The chromiferous dyestuff, containing about one atom of chromium for each molecule of the above described azo compound, gives very fast black dyeings on wool.

What I claim is:

1. The process of producing new azo dyestuffs containing chromium, which consists in coupling the diazo compound of a 1-amino-2-naphthol with 1-naphthol-8-sulfonic acid and treating the product thus obtained with a chromium compound.

2. The process of producing new azo dyestuffs containing chromium, which consists in coupling the diazo compound of a 1-amino-2-naphthol with 1-naphthol-8-sulfonic acid and boiling the product thus obtained with chromium formate solution.

3. The process of producing a new azo dyestuff containing chromium, which consists in coupling the diazo compound of 1-amino-2-naphthol-4-sulfonic acid with 1-naphthol-8-sulfonic acid and boiling the product thus obtained with chromium formate solution.

4. As new articles of manufacture, the new azo dyestuffs containing chromium obtainable by coupling the diazo compound of a 1-amino-2-naphthol with 1-naphthol-8-sulfonic acid and treating the product thus obtained with a chromium compound.

5. As a new article of manufacture, the new azo dyestuff containing chromium, which gives clear blue dyeings with a greenish tinge on wool, obtainable by coupling the diazo compound of 1-amino-2-naphthol-4-sulfonic acid with 1-naphthol-8-sulfonic acid and boiling the product thus obtained with chromium formate solution.

In testimony whereof I have hereunto set my hand.

HANS KÄMMERER.